(12) United States Patent
Nesbitt et al.

(10) Patent No.: US 6,250,411 B1
(45) Date of Patent: Jun. 26, 2001

(54) MOTOR VEHICLE POWER TRAIN

(75) Inventors: David Charles Nesbitt; David John Tickle, both of Leamington Spa; Clive David Woolmer, Coventry, all of (GB)

(73) Assignee: Rover Group Limited, Warwick (GB)

(*) Notice: Subject to any disclaimer, the term of this patent is extended or adjusted under 35 U.S.C. 154(b) by 0 days.

(21) Appl. No.: 09/180,709

(22) PCT Filed: Jun. 5, 1997

(86) PCT No.: PCT/GB97/01516
  § 371 Date: Nov. 13, 1998
  § 102(e) Date: Nov. 13, 1998

(87) PCT Pub. No.: WO97/46407
  PCT Pub. Date: Dec. 11, 1997

(30) Foreign Application Priority Data

Jun. 6, 1996 (GB) .................................................. 9611819

(51) Int. Cl.[7] .................................................. B60K 17/346
(52) U.S. Cl. .................................................. 180/248; 475/206
(58) Field of Search .................................. 180/233, 248, 180/249, 250; 475/198, 202, 206

(56) References Cited

U.S. PATENT DOCUMENTS

| | | | |
|---|---|---|---|
| 2,904,905 | * | 9/1959 | Armington ............................. 180/248 |
| 3,073,405 | * | 1/1963 | Hill et al. .............................. 180/248 |
| 4,381,828 | | 5/1983 | Lunn et al. . |
| 4,538,700 | * | 9/1985 | Suzuki ................................. 180/248 |
| 4,805,720 | | 2/1989 | Clenet . |
| 5,010,975 | * | 4/1991 | Sommer ............................... 180/249 |
| 5,065,835 | * | 11/1991 | Richter et al. ....................... 180/249 |
| 5,209,321 | * | 5/1993 | Sado .................................... 180/248 |

FOREIGN PATENT DOCUMENTS

| | | |
|---|---|---|
| 2695880 | 3/1994 | (FR) . |
| 476619 | 12/1937 | (GB) . |
| 453838 | 9/1996 | (GB) . |

OTHER PUBLICATIONS

Patent Abstracts of Japan, vol. 009, No. 215 (M–409 , Sep. 3, 1985 and JP 60 076422 A (Iseki Noki KK), Apr. 30, 1985.

* cited by examiner

*Primary Examiner*—Anne Marie Boehler
(74) *Attorney, Agent, or Firm*—Davis and Bujold, P.L.L.C.

(57) ABSTRACT

A motor vehicle power train includes an engine (26) mounted longitudinally in the vehicle adjacent one end, a change speed transmission (28) spaced from and drivably connected to the engine through an input propshaft (31) and a transfer transmission (29) mounted on the change speed transmission and drivably connected to a front differential through a front propshaft (34) and to a rear differential through a rear propshaft (35). The change speed transmission has an input shaft (39) to receive drive at one end from the engine and an output shaft (41) axially offset from the input shaft and having a drive output at the opposite end. The transfer transmission is arranged at the opposite end of the change speed transmission and includes a center differential (56) having differential output shafts (57, 58) drivably connected to the front and rear propshafts and axially offset from the input shaft and the change speed transmission output shaft.

16 Claims, 3 Drawing Sheets

MOTOR VEHICLE POWER TRAIN

The invention relates to motor vehicle power trains and is particularly concerned with power trains of four wheel drive vehicles of the type which have a longitudinally mounted engine.

Known power trains of conventional four wheel drive vehicles typically comprise a change speed transmission mounted axially in line with the engine and a transfer transmission which is mounted directly on the change speed transmission to drive front and rear differentials through propshafts offset from the engine and the change speed transmission. Alternatively, a separate transfer transmission is spaced from the change speed transmission and connected to it through a short universally jointed propshaft.

Packaging of power trains in motor vehicles is of increasing importance particularly as vehicles become more compact and available space decreases. This creates a conflict for the vehicle designer between providing adequate accommodation for the driver and passengers and mounting the power train components in an arrangement most appropriate for their function of driving the vehicle. Hence an object of the present invention is to provide a motor vehicle power train which helps to optimise the available space.

According to one aspect of the invention there is provided a power train for a motor vehicle having a pair of front wheels and a pair of rear wheels, the power train comprising an engine which, in use, is mounted longitudinally in the vehicle, a change speed transmission drivably connected to the engine, a front differential disposed, in use, between the front wheels and drivably connected thereto, a rear differential disposed, in use, between the rear wheels and drivably connected thereto and a transfer transmission mounted on the change speed transmission and drivably connected to the front differential through a front propshaft and to the ear differential through a rear propshaft, the change speed transmission having an input shaft arranged to receive drive from the engine at one end of the change speed transmission and an output shaft axially offset from the input shaft and having a drive output at the opposite end of the change speed transmission, the transfer transmission being arranged at said opposite end of the change speed transmission for receiving the drive output therefrom and including a centre differential having differential output shafts drivably connected to the front and rear propshafts and axially offset from the input shaft and from the change speed transmission output shaft, characterised in that the engine is, in use, mounted adjacent one end of the vehicle and that the change speed transmission is spaced from and drivably connected to the engine by an input propshaft.

Conveniently the change speed transmission includes constant mesh gear trains each comprising a pair of gears, one gear of each pair being mounted on the input shaft and the other of each pair being mounted on the output shaft, in which case one gear of each pair may be fixed to or integral with the input shaft, the other gear of each pair being selectably connected to the output shaft.

Similarly, the transfer transmission may includes constant mesh gear trains each comprising a pair of gears, one gear of each pair being mounted on the output shaft and the other of each pair being mounted on the centre differential, in which case said one gear of each pair may be fixed to or integral with the centre differential, the other gear of each pair being selectably connected to the output shaft.

A drive coupling such as a clutch or torque converter may be mounted on the engine and the input propshaft be interposed between the drive coupling and the input shaft of the change speed transmission In order to minimise costs, a change speed transmission used in the present invention can be based on one which has been initially designed for use on front wheel drive motor cars with transverse engines. Such transmissions have been increasingly popular since about 1960. Since then, most drive lines have comprised a change speed transmission mounted in line with the engine, an input shaft of the transmission being axially aligned with the engine and an output shaft being parallel with and spaced from the input shaft with the input shaft and the output shaft both extending from the change speed transmission at the same end. The output shaft has a gear which directly drives a gear mounted on a cage of a differential mounted on the rear of the change speed transmission, the differential having drive shafts directly connected to the front wheels. The change speed transmission used in the conventional type of four wheel drive power trains described above was usually able to use a casing, rotary drive components and selector components substantially identical to those produced for the change speed transmission used for conventional front engine, rear wheel drive motor vehicles where the change speed transmission was directly connected to a rear axle through a longitudinal propshaft. The production of new designs of change speed transmission for such conventional drive arrangements is becoming increasingly rare as change speed transmissions are designed and developed for the large numbers of vehicles now produced with transverse engines. Therefore, the change speed transmission used in the power train in accordance with the invention preferably includes a casing, rotary drive components and selector components substantially identical to those produced for a change speed transmission used in a front wheel drive motor vehicle where the change speed transmission has a drive input shaft and a drive output shaft extending from the same end of the change speed transmission, the change speed transmission having been modified to position the drive input shaft at the opposite end to the drive output shaft for receiving drive from the input propshaft. Such an arrangement is particularly advantageous as a known type of front wheel drive change speed transmission can be used and modified to position its drive input shaft at the opposite end from that for which the transmission was designed. In practice, such a modification is fairly straightforward as it will leave the internal selector components and gear trains unchanged thereby minimising the cost of the change speed transmission.

Preferably, the transfer gearing is positioned substantially midway between the front and rear differentials. In that way, the front and rear propshafts can be made of substantially equal length.

Also novel and according to another aspect of the invention is a motor vehicle which incorporates a power train according to said one aspect of the invention. In such a motor vehicle, the change speed transmission can be housed partly within a tunnel formed in a floor of the motor vehicle in which it is installed. In such a case, we prefer that the tunnel projects upwardly into the interior of the vehicle between foot wells for front and rear passengers so as not to intrude into either of the foot wells.

The invention will now be described by way of example and with reference to the accompanying drawings in which.

Figure 1:
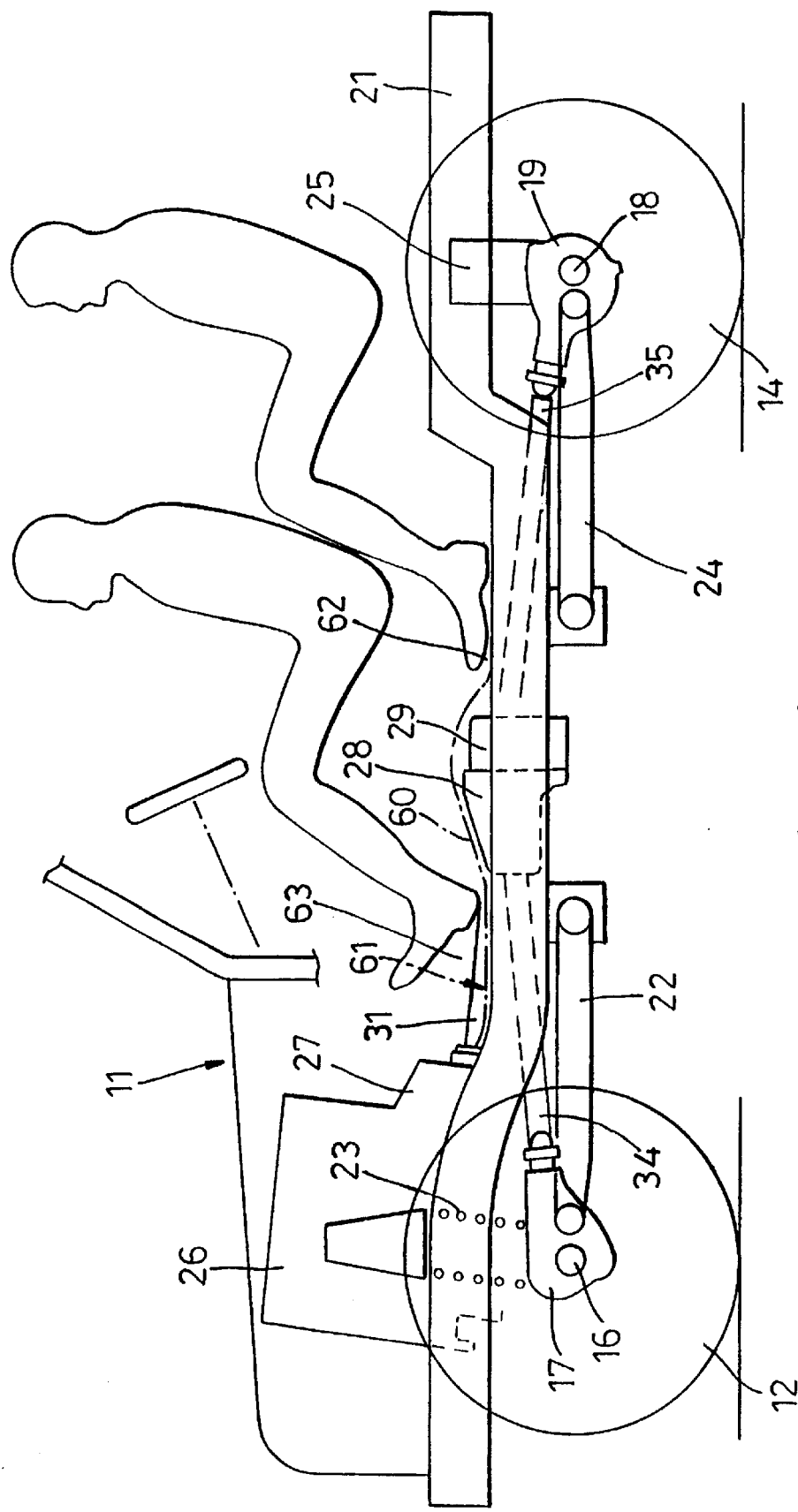
FIG. 1 is a diagrammatic side elevation of a motor vehicle incorporating a power train in accordance with the invention.
Figure 2:
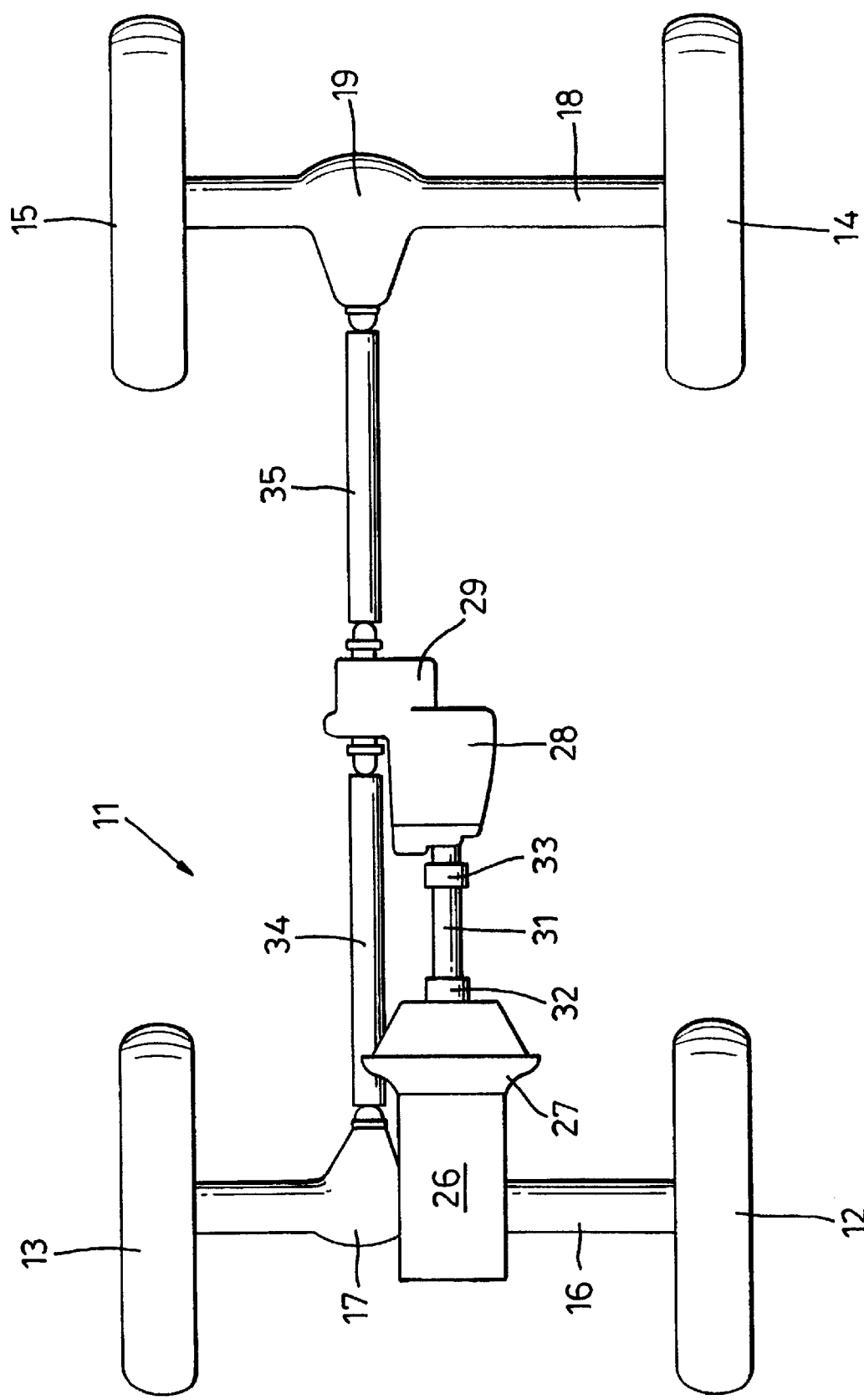
FIG. 2 is a plan view of the vehicle shown in FIG. 1 showing the power train and wheels.

In FIGS. 1 and 2, a motor vehicle 11 includes a pair of front wheels 12, 13 and a pair of rear wheels 14, 15. The front wheels 12, 13 are carried by a front axle 16 having a differential unit 17. Similarly, the rear wheels 14, 15 are carried by a rear axle 18 having a differential 19. The front axle 17 is suspended from a vehicle chassis 21 by means of leading links 22 and coil springs 23. The rear axle 18 is suspended from the chassis 21 by means of trailing links 24 and air springs 25.

The front and rear axles 16, 18 form part of a power train which also includes an engine 26, a bell housing 27 which covers a flywheel and a clutch attached to a crankshaft of the engine 26, a change speed transmission 28 and a transfer transmission 29 mounted on the change speed transmission 28. The change speed transmission 28 and the transfer transmission 29 are mounted spaced from and independently of the engine 26, the change speed transmission 28 being drivingly connected to the engine by an input propshaft 31 having universal joints 32 and 33 arranged one each end. The transfer transmission 29 is drivingly connected to the front differential 17 by a front propshaft 34 and to the rear differential 19 through a rear propshaft 35.

Figure 3:
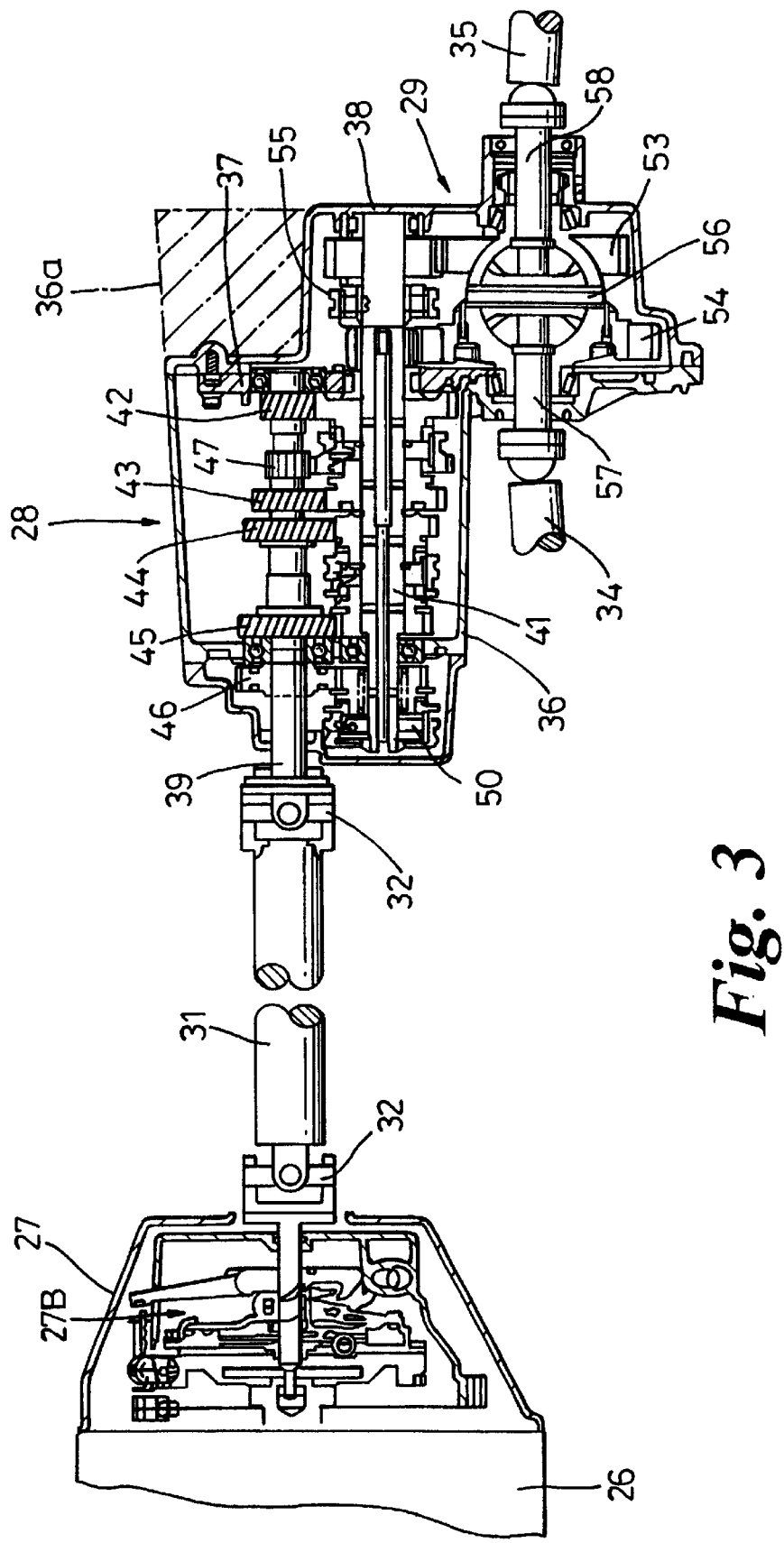
FIG. 3 is a longitudinal cross-section of the change speed transmission and a transfer transmission shown in FIGS. 1 and 2.

FIG. 3 shows the change speed transmission 28 and transfer transmission 29 in more detail. The change speed transmission 28 has a housing which comprises a main casing 36 and an end plate 37. Similarly, the transfer transmission 29 includes a housing comprising a main casing 38 and the end plate 37 which it shares with the change speed transmission 28. Rotating components of the change speed transmission 28 include a input shaft 39 and an output shaft 41 both journalled in the main casing 36 of the change speed transmission and in the end plate 37. The input shaft 39 and the output shaft 41 are axially offset, i.e. their axes are offset from each other, and project from opposite ends of the change speed transmission 28, the input shaft 39 projecting from the front end of the change speed transmission towards the engine 26 and the output shaft 41 projecting through the end plate 37 towards the rear axle 18. The output shaft 41 drives a lubricating oil pump 50.

The change speed transmission 28 includes first, second, third, fourth and fifth forward ratio constant mesh gear trains 42, 43, 44, 45 and 46 respectively, each gear train comprising a pair of gears, one gear of each pair being fixed to or integral with the input shaft 39 and the other of each pair being mounted on the output shaft 41 for selection by synchromesh clutches. A conventional selector mechanism (not shown) is used to select the gears and a reverse gear train 47 is engaged by moving a reverse idler gear (not shown) into mesh.

The output shaft 41 acts as an input shaft for the transfer transmission 29, the driving gears of two pairs of output gear trains 53, 54 being mounted on the output shaft 41 and selectable by a synchromesh mechanism 55 to give a high range output (gear train 53) or a low range output (gear train 54). The driven gears of the gear trains 53 and 54 form part of an input member of a centre differential 56. If desired, the differential may be of a limited slip type, e.g. a Torsen (Trade Mark).

The outputs of the centre differential 56 are connected to flanged stub shafts 57 and 58 which are connected to the front propshaft 34 and the rear propshaft 35 respectively. The stub shafts 57, 58 are axially offset from the input shaft 39 and the output shaft 41.

It is desirable that the front and rear propshafts 34, 45 are of substantially equal length which will help to reduce any vibration and harshness caused or exacerbated by the use of excessively short propshafts and increases the service life of the associated universal joints. By positioning the transfer transmission 29 substantially midway between the axles 16 and 18, the polar moment of inertia of the vehicle is reduced and the various components of the transmission can be packaged to provide good ground clearance without undue difficulty. For example, it will be noted from FIG. 1 that by placing the transfer transmission 29 at the mid point of the vehicle, a tunnel 60 formed in a floor 61 of the vehicle will be positioned well forward of a rear passenger foot well 62 and will not intrude into a front passenger foot well 63. That feature is particularly advantageous from the point of view of passenger leg room and comfort.

By spacing the change speed transmission and the transfer transmission 28 and 29 from the engine 26 and bell housing 27, there is greater space available for the packaging of engine auxiliaries, particularly exhaust components. In particular, a catalytic converter can be positioned close to the engine 26 i.e. with only a short intermediate length of pipe, so that it can reach its operational temperature much sooner that if it is positioned further from the engine. A further advantage is that mountings for the engine 26 are required to absorb engine torque only. However, in a modification, the bell housing 27 and the casing of the change speed transmission 28 are connected by a tubular housing 27A which surrounds the input propshaft and which eliminates the need for universal joints.

The change speed transmission 28 and the transfer transmission 29 are integrated to a large extent and, in the arrangement shown in FIG. 3, use a common lubricating oil system. The main casing 36, the input shaft 39 and all the gear wheels and parts of the synchromesh mechanism associated with the gear trains 42, 43, 44, 45, 46 and 47 are all common to or substantially identical to corresponding parts of a "parent" transmission produced for a front wheel drive motor vehicle having an engine mounted transversely in the vehicle, the output shaft in the parent transmission normally driving a differential connected to output shafts which drive the front wheels. This greatly reduces the number of components which are specific to the change speed transmission 28 and allows for a considerable cost reduction since transverse engine front wheel drive cars are produced in very large numbers whereas four wheel drive vehicles have a relatively low production volume. The parent change speed transmission is, however, modified so that the input shaft 39 extends from the opposite end for which it was designed so that the transfer transmission 29 and the input shaft 39 will be arranged at opposite ends of the change speed transmission. However, it will be appreciated that the modification does not involve any changes to the gear trains and synchromesh mechanisms.

Where drive input in the parent transmission was originally transmitted to the opposite end to that shown in FIG. 3, the casing of the parent change speed transmission followed the line indicated in broken lines at 36a. By placing the drive input shaft 39 at the opposite end, the casing can be modified as shown in full lines in FIG. 3 thereby leaving the hatched area empty which is useful from the point of view of packaging.

A transmission assembly comprising the change speed transmission 28 and the transfer transmission 29 can be considerably more compact than a comparable assembly of a conventional longitudinal engine 4×4 drive train where the output from the change speed transmission is axially in line with the input. this is largely achieved by the differential output shafts 57, 58 and the change speed transmission output shaft being axially offset from the input shaft 39, allowing the input gears of the transfer transmission gear trains 53, 54 to be axially offset from the input shaft 39. Further space saving is achieved by having the fixed gears of the gear trains 42, 43, 44, 45 and 46 on the input shaft 39, these generally being smaller than the gears on the output shaft which have to accommodate the synchromesh clutches.

Although specific reference has been made to a synchromesh change speed transmission 28, the change speed transmission could comprise an automatic transmission and the input propshaft 31 could, in such a case, transmit drive from a torque converter mounted on the engine 26.

Although conventional beam axles 16, 18 are shown, the invention is equally applicable to vehicles with independent suspensions or other suspensions of the kind in which the axle differential is not wholly part of the unsprung mass.

Whilst the transfer transmission 39 shown is of a two speed ratio High/Low range-change type, the invention may be used with a single speed ratio transfer transmission.

The vehicle shown in FIG. 1 has a chassis 21 around which a body of the vehicle is built. However, it will be understood that the vehicle may instead be of monocoque construction.

What is claimed is:

1. In a motor vehicle having a pair of front wheels and a pair of rear wheels, a power train comprising:
    an engine mounted longitudinally in the vehicle adjacent a front end thereof;
    a front differential disposed between the front wheels and drivably connected thereto;
    a rear differential disposed between the rear wheels and drivably connected thereto;
    a change speed transmission mounted spaced from the engine and intermediate and spaced from the front and rear differentials, the change speed transmission having a casing, an input shaft and an output shaft axially offset from the input shaft;
    a transfer transmission mounted on the change speed transmission and drivably connected thereto, the transfer transmission being arranged at an opposite end of the change speed transmission from the engine to receive a drive output from the output shaft of the change speed transmission, the transfer transmission including a center differential having front and rear differential output shafts axially offset from the input shaft and the output shaft of the change speed transmission;
    an input propshaft drivably connecting the engine to the input shaft of the change speed transmission;
    a front propshaft drivably connecting the front differential output shaft to the front differential; and
    a rear propshaft drivably connecting the rear differential output shaft to the rear differential.

2. A power train according to claim 1 in which the change speed transmission includes constant mesh gear trains each comprising a pair of gears, one gear of each pair being mounted on the input shaft and the other of each pair being mounted on the output shaft.

3. A power train according to claim 2 in which said one gear of each pair is fixed to or integral with the input shaft and the other gear of each pair is selectably connected to the output shaft.

4. A power train according to claim 1 in which the transfer transmission includes constant mesh gear trains each comprising a pair of gears, one gear of each pair being mounted on the output shaft and the other of each pair being mounted on the center differential.

5. A power train according to claim 4 in which said one gear of each pair is fixed to or integral with the center differential and the other gear of each pair is selectably connected to the output shaft.

6. A power train according to claim 1 in which the change speed transmission includes a casing, rotary drive components and selector components wherein the change speed transmission has the drive input shaft positioned at the opposite end to the drive output for receiving drive from the input propshaft.

7. A power train according to claim 1 in which the change speed transmission and the transfer transmission are integrated and share common components.

8. A power train according to claim 1 in which the change speed transmission and the transfer transmission are mounted independently of the engine.

9. A power train according to claim 1 and further comprising a drive coupling mounted on the engine, the input propshaft being interposed between the drive coupling and the input shaft of the change speed transmission.

10. A power train according to claim 9 further comprising a bell housing on the engine and in which the drive coupling is mounted and a tubular housing which surrounds the input propshaft and connects the bell housing to the casing of the change speed transmission.

11. A power train according to claim 1 wherein the input propshaft has a universal joint at each end.

12. A power train according to claim 1 in which the transfer transmission is in use mounted substantially midway between the front and rear differentials.

13. A power train according to claim 1 in which the front and rear propshafts are of substantially equal length.

14. A motor vehicle having a pair of front wheels, a pair of rear wheels and a power train comprising:
    an engine mounted longitudinally in the vehicle adjacent a front end thereof;
    a front differential disposed between the front wheels and drivably connected thereto;
    a rear differential disposed between the rear wheels and drivably connected thereto;
    a change speed transmission mounted in a substantially central location of the vehicle spaced from the engine and intermediate and spaced from the front and rear differentials, the change speed transmission having a casing, an input shaft and an output shaft axially offset from the input shaft;
    a transfer transmission mounted on the change speed transmission and drivably connected thereto, the transfer transmission being arranged at an opposite end of the change speed transmission from the engine to receive a drive output from the output shaft of the change speed transmission, the transfer transmission including a center differential having front and rear differential output shafts axially offset from the input shaft and the output shaft of the change speed transmission;
    an input propshaft drivably connecting the engine to the input shaft of the change speed transmission;
    a front propshaft drivably connecting the front differential output shaft to the front differential; and
    a rear propshaft drivably connecting the rear differential output shaft to the rear differential.

15. A motor vehicle having a pair of front wheels, a pair of rear wheels and a power train comprising:
    an engine mounted longitudinally in the vehicle adjacent a front end thereof;

a front differential disposed between the front wheels and drivably connected thereto;

a rear differential disposed between the rear wheels and drivably connected thereto;

a change speed transmission mounted spaced from the engine and intermediate and spaced from the front and rear differentials, the change speed transmission having a casing, an input shaft and an output shaft axially offset from the input shaft;

a transfer transmission mounted on the change speed transmission and drivably connected thereto, the transfer transmission being arranged at an opposite end of the change speed transmission from the engine to receive a drive output from the output shaft of the change speed transmission, the transfer transmission including a center differential having front and rear differential output shafts axially offset from the input shaft and the output shaft of the change speed transmission;

an input propshaft drivably connecting the engine to the input shaft of the change speed transmission;

a front propshaft drivably connecting the front differential output shaft to the front differential;

a rear propshaft drivably connecting the rear differential output shaft to the rear differential; and a floor defining a tunnel in which the change speed transmission is partly housed.

16. A motor vehicle according to claim 15 in which the floor defines footwells for front and rear passengers and the tunnel projects upwardly between the footwells.

* * * * *